(12) United States Patent
Obara

(10) Patent No.: US 7,510,330 B2
(45) Date of Patent: Mar. 31, 2009

(54) FLUID DYNAMIC BEARING AND A STORAGE DISK DRIVE WITH A SPINDLE MOTOR HAVING THE FLUID DYNAMIC BEARING

(75) Inventor: Rikuro Obara, Nagano (JP)

(73) Assignee: Minebea Co., Ltd., Nagano (JP)

( * ) Notice: Subject to any disclaimer, the term of this patent is extended or adjusted under 35 U.S.C. 154(b) by 336 days.

(21) Appl. No.: 11/596,418

(22) PCT Filed: May 11, 2005

(86) PCT No.: PCT/US2005/016389

§ 371 (c)(1),
(2), (4) Date: Nov. 9, 2006

(87) PCT Pub. No.: WO2005/113995

PCT Pub. Date: Dec. 1, 2005

(65) Prior Publication Data

US 2008/0037915 A1 Feb. 14, 2008

(30) Foreign Application Priority Data

May 12, 2004 (JP) .............................. 2004-142965
Apr. 13, 2005 (JP) .............................. 2005-115329

(51) Int. Cl.
*F16C 32/06* (2006.01)
(52) U.S. Cl. ...................................... 384/119; 384/130
(58) Field of Classification Search ................. 384/100, 384/107–119, 130
See application file for complete search history.

(56) References Cited

U.S. PATENT DOCUMENTS 6,296,391 B1 10/2001 Hayakawa et al.
6,766,817 B2 7/2004 Da Silva
6,918,404 B2 7/2005 Dias da Silva
7,066,586 B2 6/2006 Da Silva

FOREIGN PATENT DOCUMENTS

JP 06-319240 11/1994

(Continued)

OTHER PUBLICATIONS

An e-mail from Dr. Elson Silva PhD, dated Apr. 7, 2008.

*Primary Examiner*—Thomas R Hannon
(74) *Attorney, Agent, or Firm*—Townsend and Townsend and Crew LLP

(57) ABSTRACT

A hydrodynamic bearing having a bearing sleeve, a rotational shaft supported for rotation by the bearing sleeve, a bearing gap formed between the bearing sleeve and the rotational shaft, lubricating oil contained within the bearing gap, at least one hydrodynamic pressure-generating groove formed at an inner peripheral surface of the bearing sleeve; and an oil reservoir. The oil reservoir includes a gradually expanding section located in a position distanced from the pressure-generating groove and a first larger inner diameter, section located adjacently to the gradually expanding section. A second larger inner diameter section is located immediately below an opening of the bearing sleeve and an oil-repelling peripheral groove located between the first larger inner diameter section of the oil reservoir and the second larger inner diameter section. The oil-repelling peripheral groove and the second larger inner diameter section constitute an oil scatter and leakage prevention mechanism of the fluid dynamic bearing.

17 Claims, 13 Drawing Sheets

FOREIGN PATENT DOCUMENTS

| | | |
|---|---|---|
| JP | 08-210364 | 8/1996 |
| JP | 08-320015 | 12/1996 |
| JP | 09-133126 | 5/1997 |
| JP | 2000-121986 | 4/2000 |
| JP | 2000-337383 | 12/2000 |
| JP | 2001-208068 | 8/2001 |
| JP | 2002-048133 | 2/2002 |
| JP | 2002-106549 | 4/2002 |
| JP | 2003-194060 | 7/2003 |

[Fig.1]
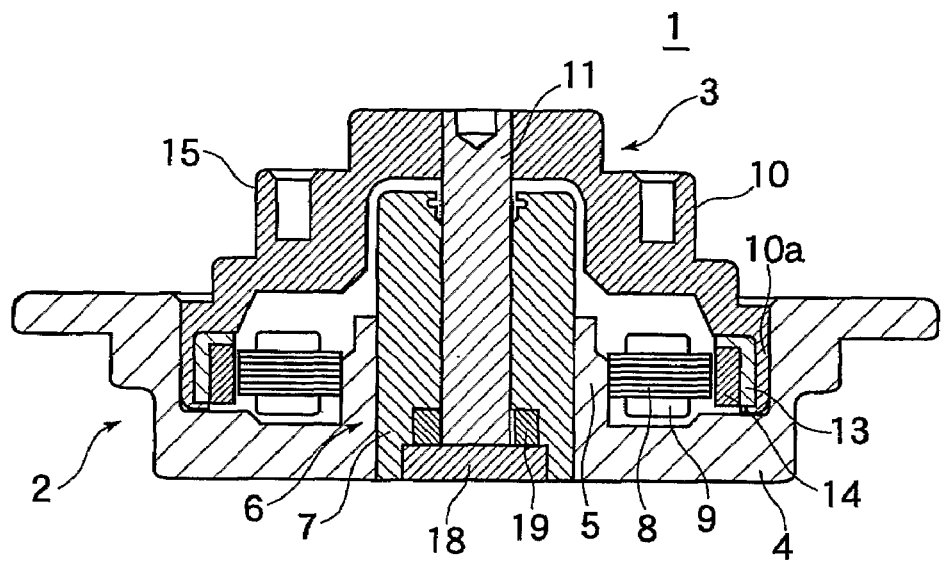
[Fig.2]
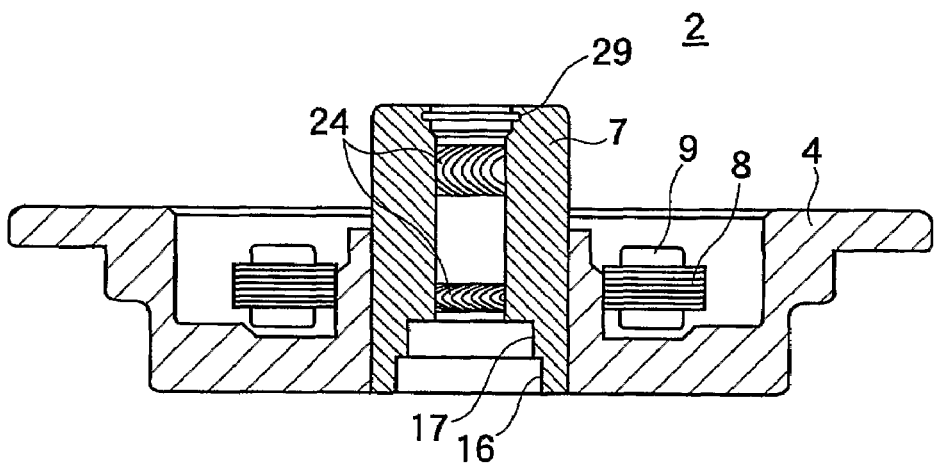

[Fig.3]
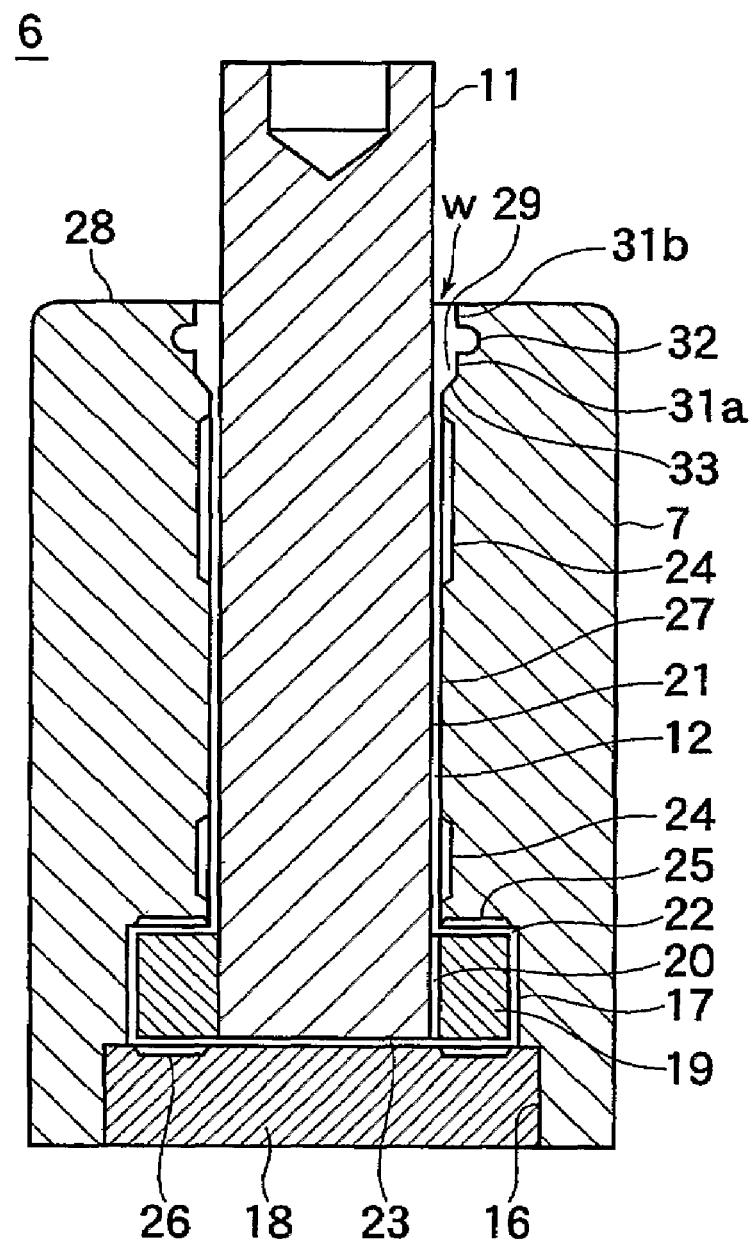

[Fig.4]
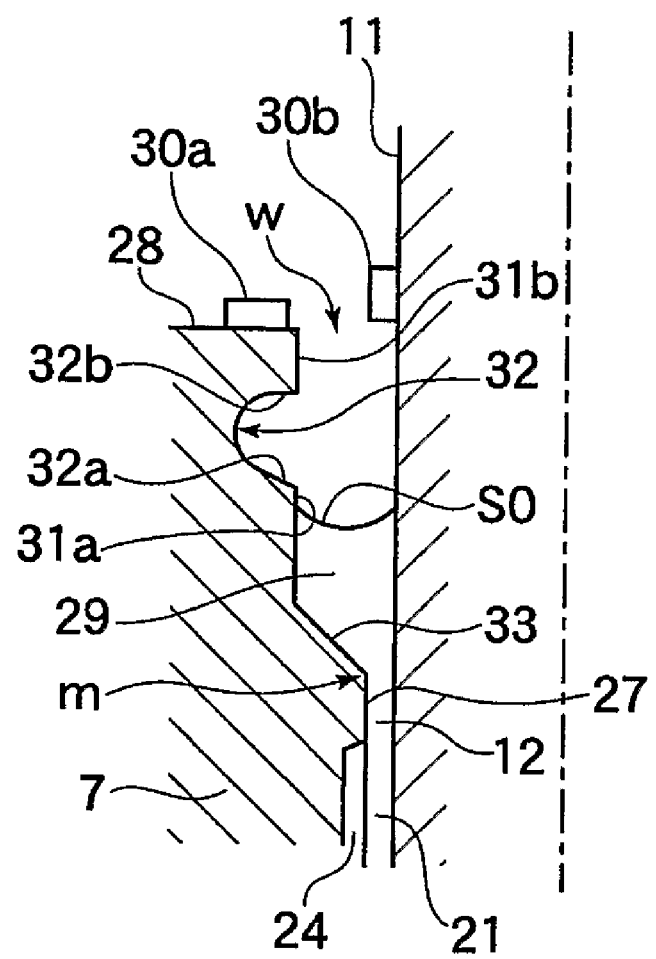

[Fig.5]
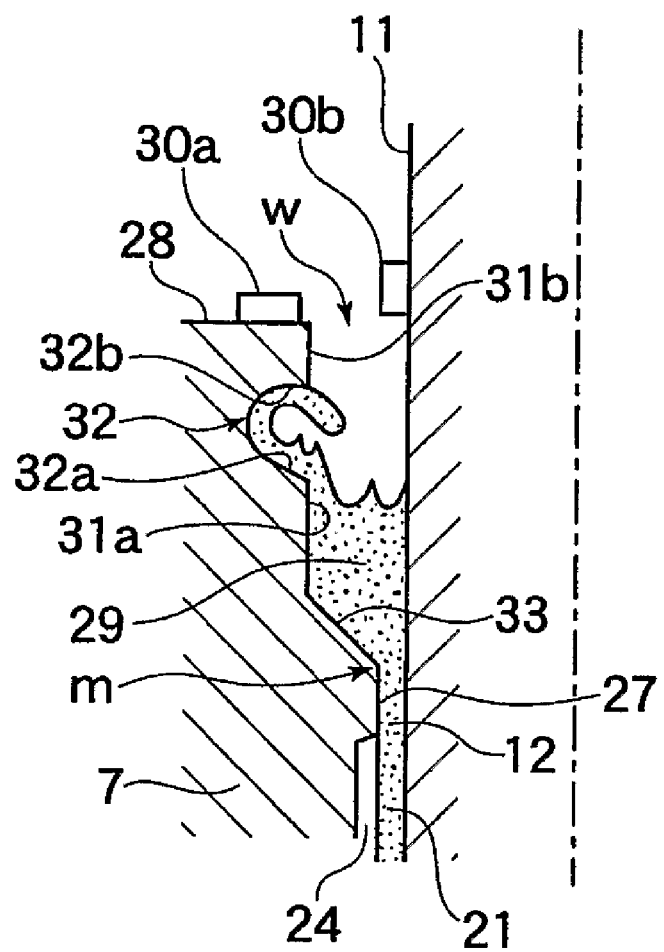

[Fig.6]
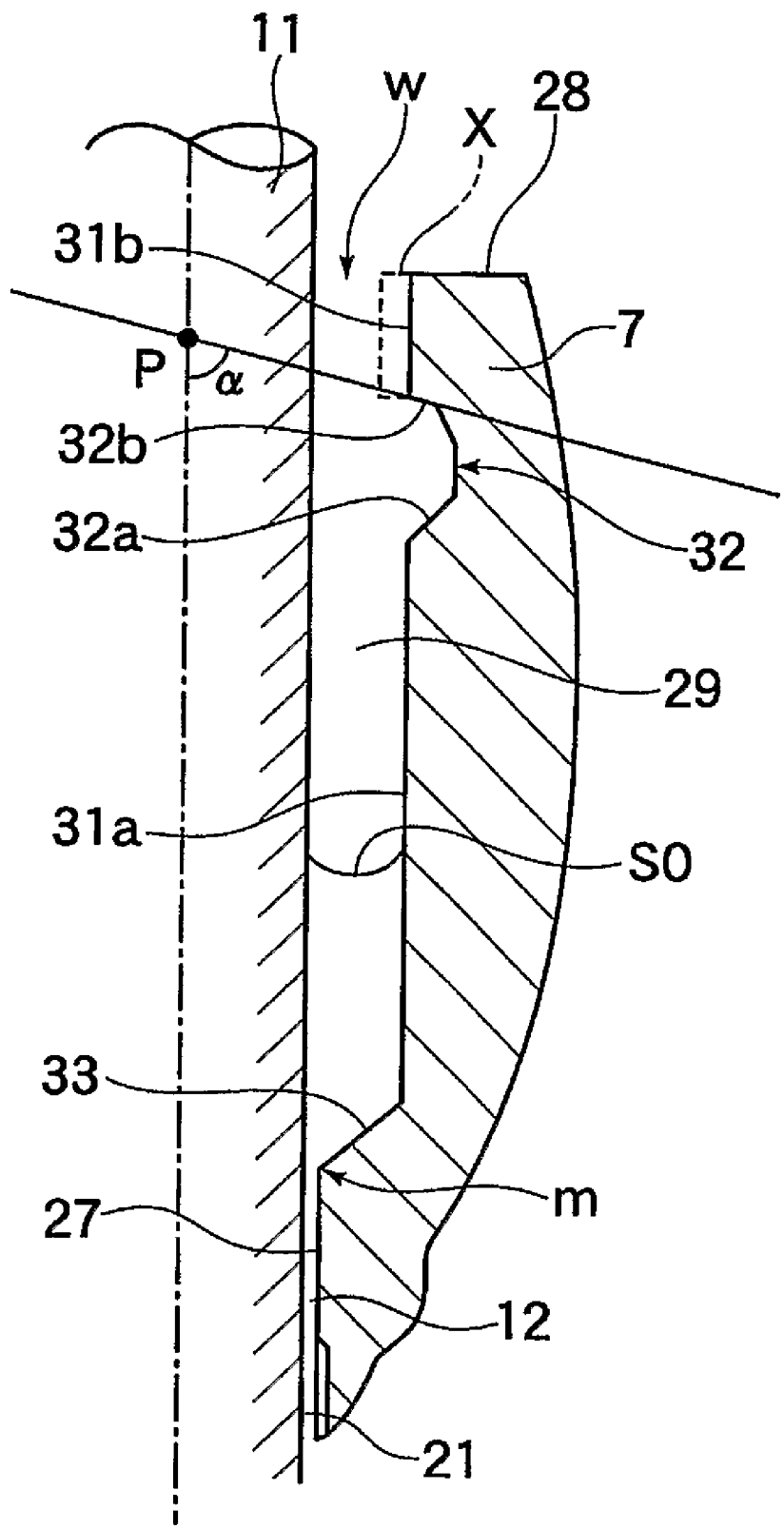

[Fig.7]
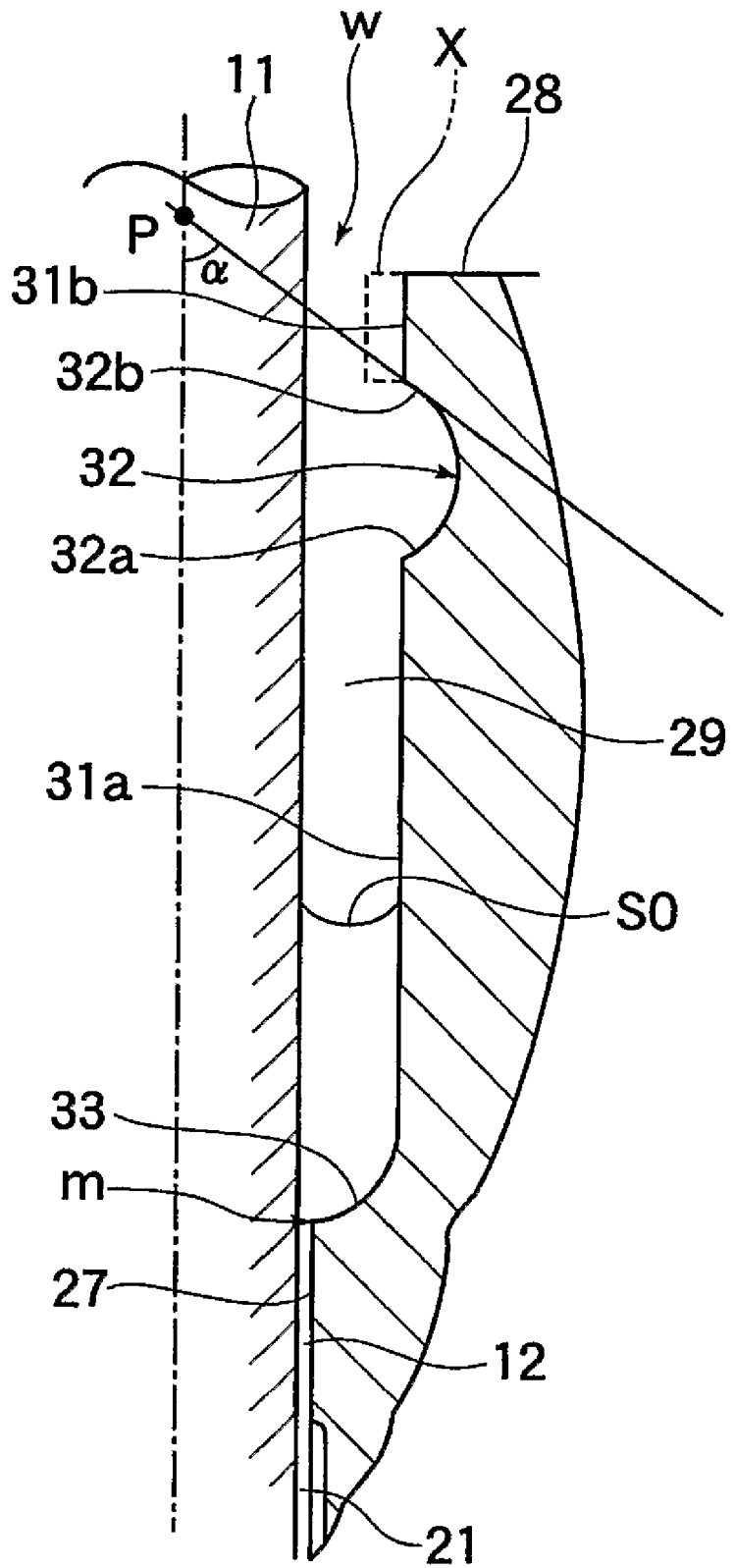

[Fig.8]
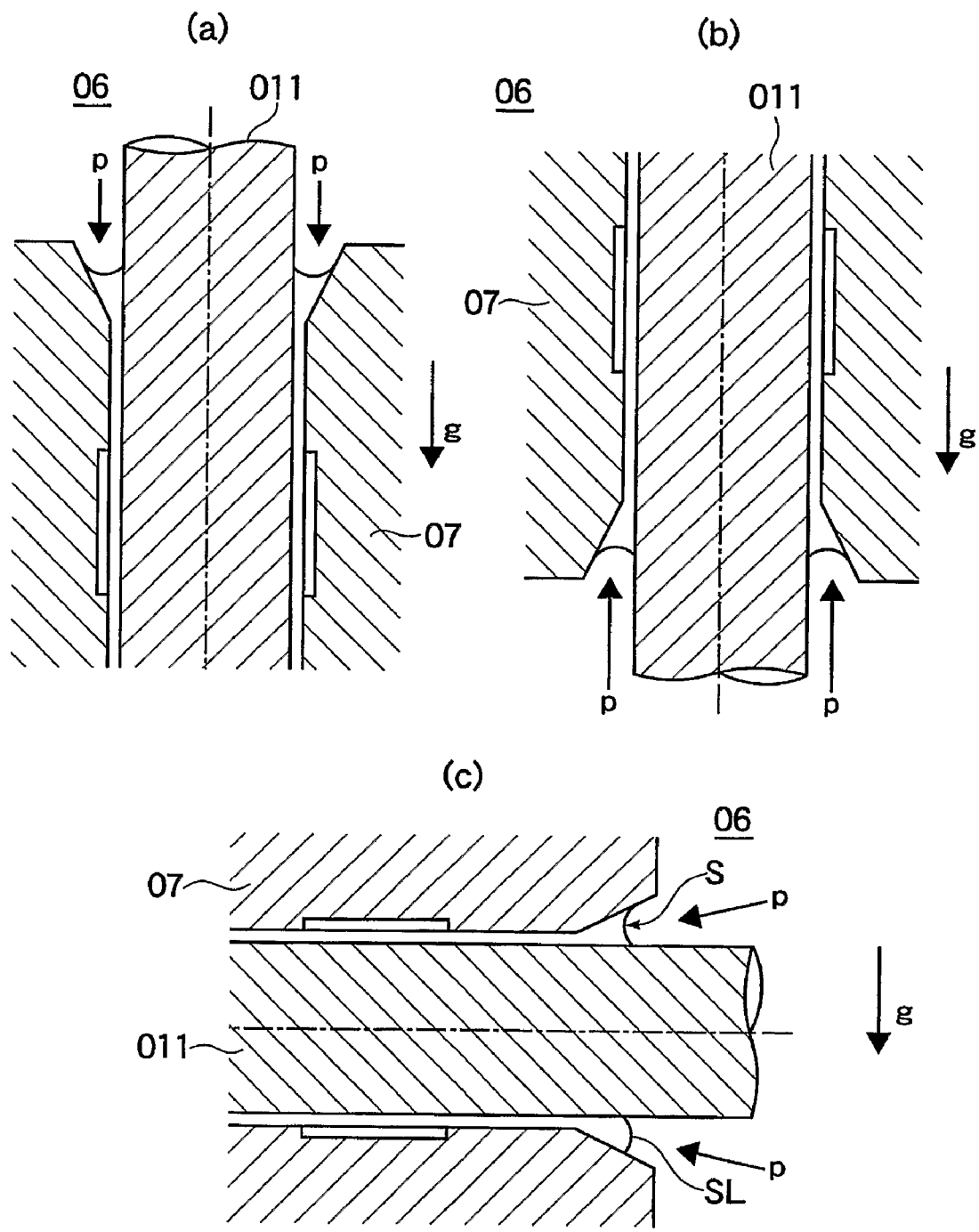

[Fig.9]
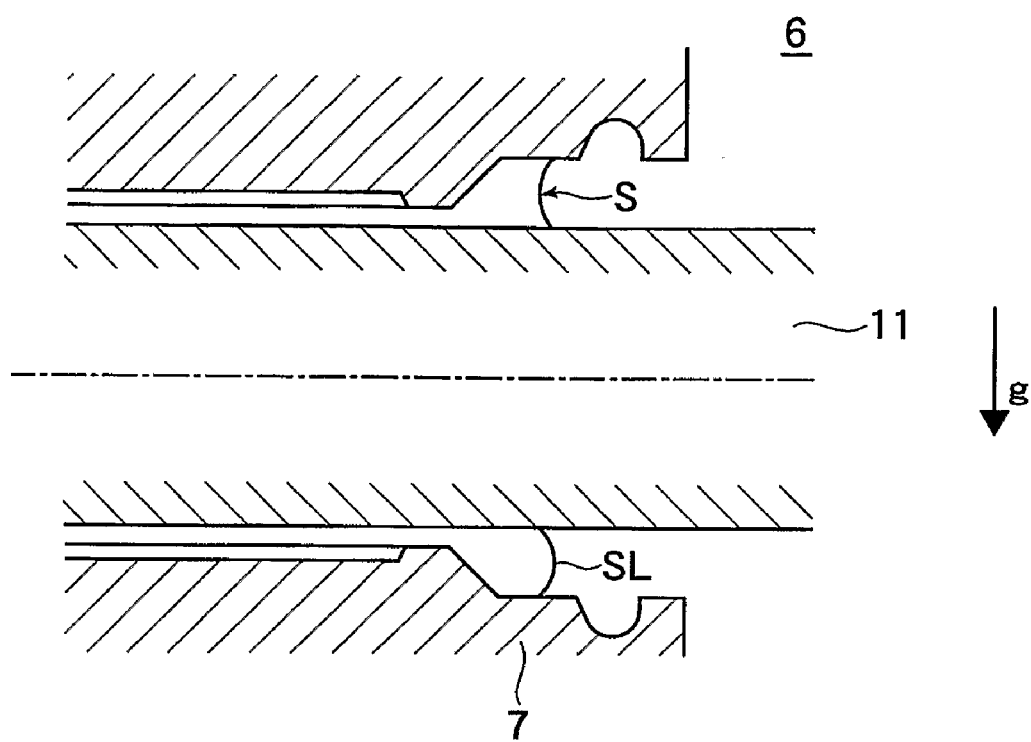

[Fig.10]

|  |  |  | Shock (Acceleration [G]) | | | | |
|---|---|---|---|---|---|---|---|
| Spindle Motor |  | Position | 100 | 300 | 500 | 7000 | 1000 |
| Straight seal structure (Present example of embodiment) | No. 1 | Facing up | O.K. | O.K. | O.K. | O.K. | O.K. |
|  |  | Facing down | O.K. | O.K. | O.K. | O.K. | O.K. |
|  |  | Facing sideways | O.K. | O.K. | O.K. | O.K. | O.K. |
|  | No. 2 | Facing up | O.K. | O.K. | O.K. | O.K. | O.K. |
|  |  | Facing down | O.K. | O.K. | O.K. | O.K. | O.K. |
|  |  | Facing sideways | O.K. | O.K. | O.K. | O.K. | O.K. |
|  | No. 3 | Facing up | O.K. | O.K. | O.K. | O.K. | O.K. |
|  |  | Facing down | O.K. | O.K. | O.K. | O.K. | O.K. |
|  |  | Facing sideways | O.K. | O.K. | O.K. | O.K. | O.K. |
| Taper seal structure (Conventional example) | No. 1 | Facing up | O.K. | O.K. | O.K. | Oil Leak | -- |
|  |  | Facing down | O.K. | O.K. | O.K. | -- | -- |
|  |  | Facing sideways | O.K. | O.K. | O.K. | -- | -- |
|  | No. 2 | Facing up | O.K. | O.K. | O.K. | O.K. | O.K. |
|  |  | Facing down | O.K. | O.K. | O.K. | O.K. | Oil Leak |
|  |  | Facing sideways | O.K. | O.K. | O.K. | O.K. | -- |
|  | No. 3 | Facing up | O.K. | O.K. | O.K. | O.K. | O.K. |
|  |  | Facing down | O.K. | O.K. | O.K. | O.K. | O.K. |
|  |  | Facing sideways | O.K. | O.K. | O.K. | O.K. | O.K. |
|  | No. 4 | Facing up | O.K. | O.K. | O.K. | O.K. | O.K. |
|  |  | Facing down | O.K. | O.K. | O.K. | O.K. | Oil Leak |
|  |  | Facing sideways | O.K. | O.K. | O.K. | O.K. | -- |
|  | No. 5 | Facing up | O.K. | O.K. | O.K. | O.K. | O.K. |
|  |  | Facing down | O.K. | O.K. | O.K. | O.K. | O.K. |
|  |  | Facing sideways | O.K. | O.K. | O.K. | O.K. | O.K. |

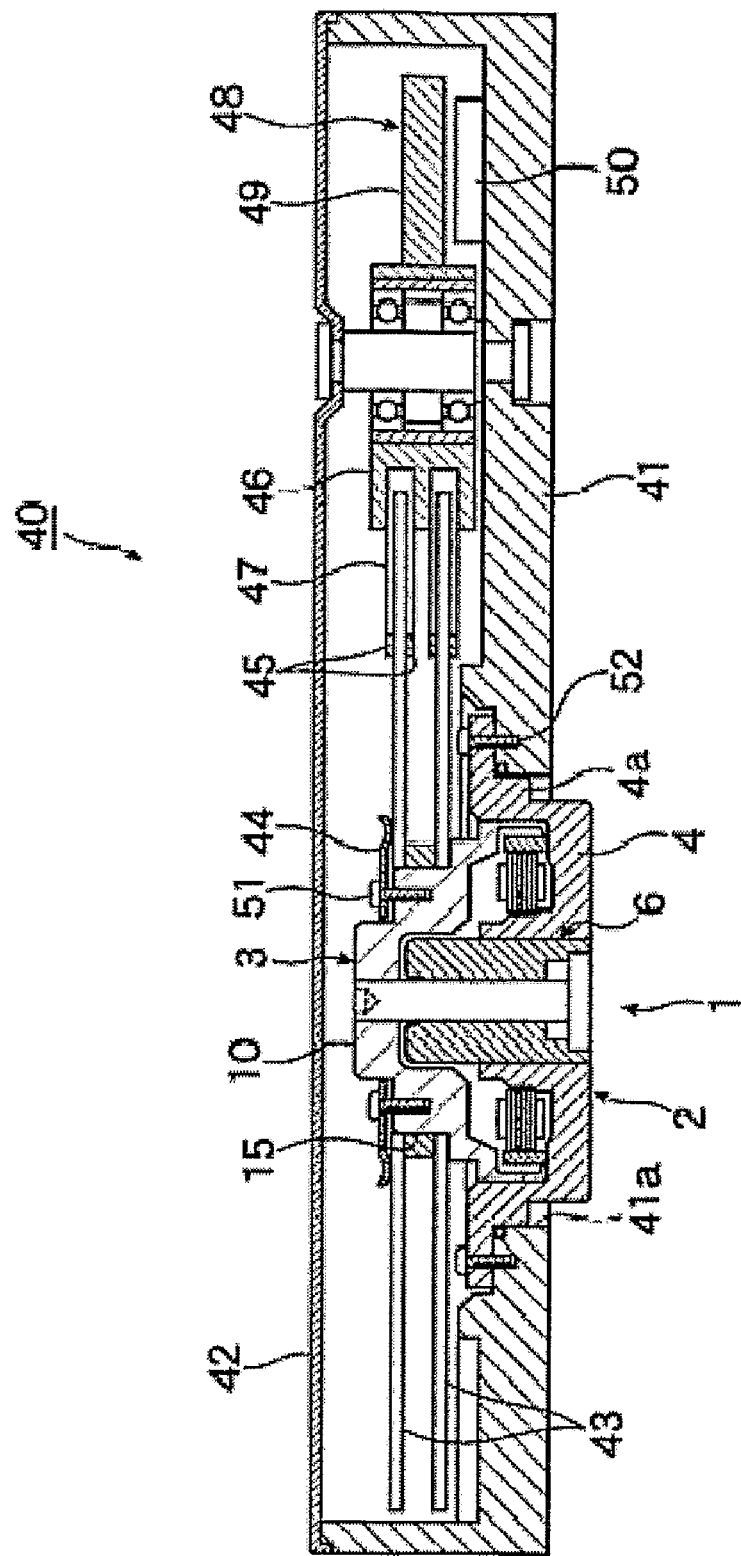
[Fig.11]

[Fig.12]
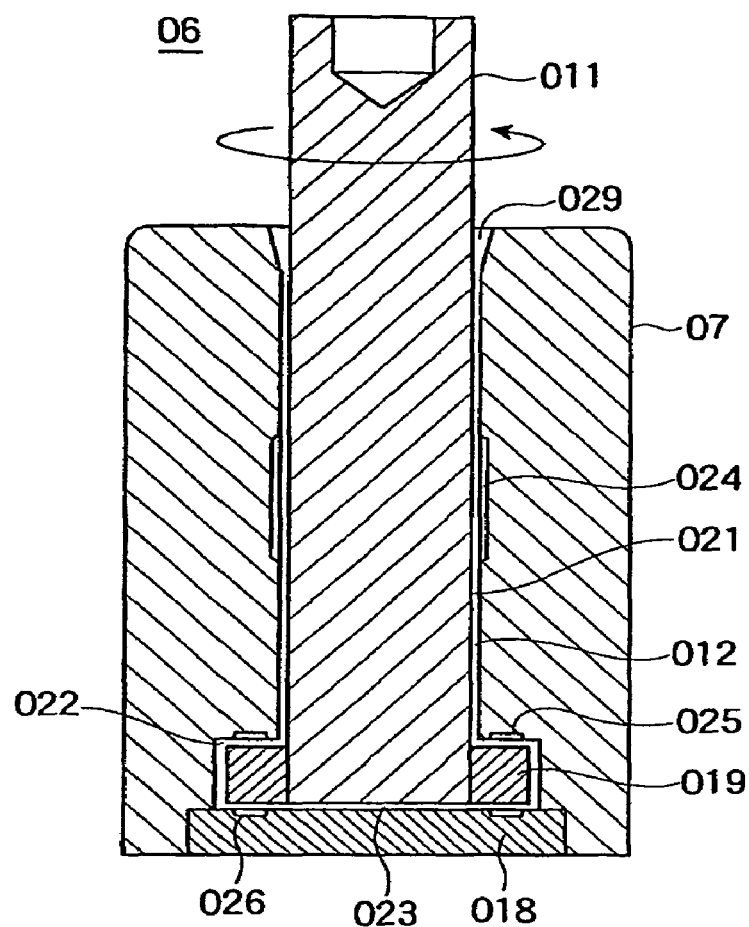
--PRIOR ART--

[Fig.13]
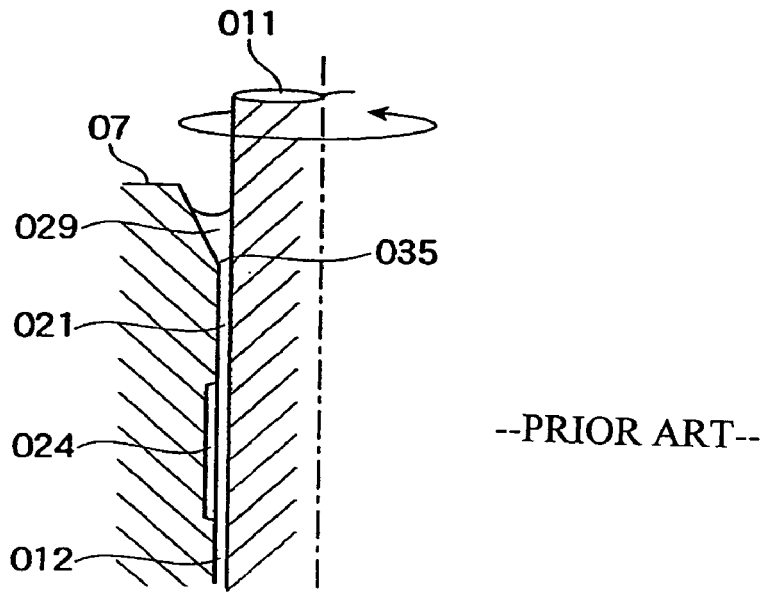
--PRIOR ART--
[Fig.14]
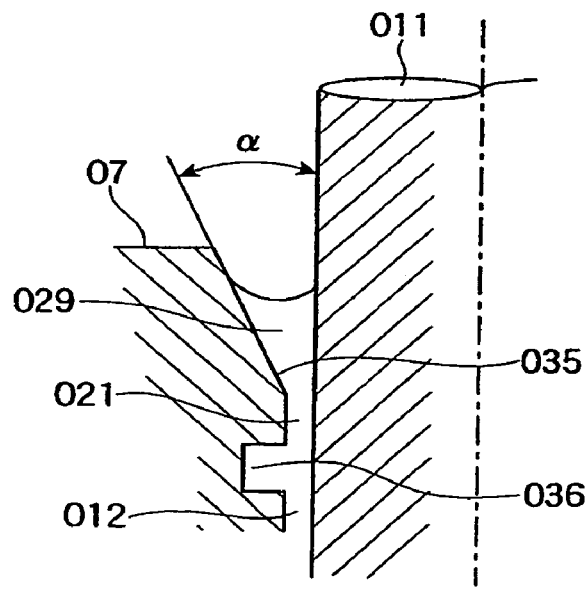
--PRIOR ART--

[Fig.15]
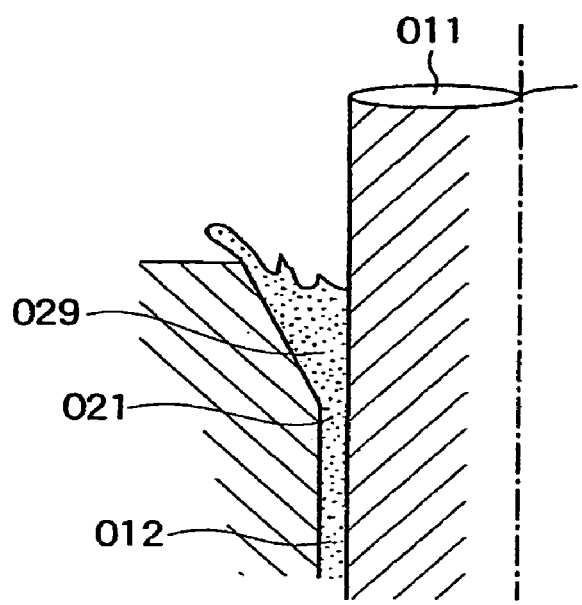
--PRIOR ART--

FLUID DYNAMIC BEARING AND A STORAGE DISK DRIVE WITH A SPINDLE MOTOR HAVING THE FLUID DYNAMIC BEARING

CROSS-REFERENCE TO RELATED APPLICATIONS

This application claims all rights of priority to Japanese Patent Application No. 2004-142965, filed on May 12, 2004, (pending) and Japanese Patent Application No. 2005-115329, filed on Apr. 13, 2005 (pending).

BACKGROUND

The invention according to the present application relates to fluid dynamic pressure bearings, spindle motors equipped with such fluid dynamic pressure bearings, and storage disk drive devices utilizing the spindle motors. More particularly, the invention relates to a leakage preventing construction of fluid dynamic pressure bearings, where lubricating oil enclosed in the bearings does not scatter or leak due to the effects of external forces, such as various shocks or vibrations, when the spindle motor is either operating or not operating.

Recent technological improvements have significantly increased the demand for smaller, thinner, and lighter data memory devices with higher density memory capacity. Magnetic and optical disks are now commonly utilized as storage devices. These new memory devices create a significant need for a new technology optimizing the rotational speed and accuracy of spindle motors used to rotate such magnetic and optical disks.

To satisfy this demand, there has been a growing trend to substitute conventional ball bearing systems, previously used to support a shaft rotating a magnetic or optical disk, with fluid dynamic bearing systems utilizing a lubricant and/or air as its medium to generate fluid dynamic pressure supporting the rotating shaft.

Such fluid dynamic bearings are already widely known, and are also known to have been applied in bearings for spindle motors. (For example, see Japanese Patent Publication No. 2937833 and U.S. Pat. No. 5,667,309) An example of a conventionally known fluid dynamic bearing is shown in FIGS. 12-15.

Conventional fluid dynamic bearing 06, shown in FIG. 12, includes a shaft 011 rotating within a bearing sleeve 07. Shaft 011 is supported for rotation by fluid dynamic bearing components located inside bearing sleeve 07. Thrust plate 019 is affixed to one end of the rotating shaft. Bearing sleeve 07 includes an inner cavity formed to receive thrust plate 019. Counter plate 018 encloses the inner cavity of bearing sleeve 07 such that the counter plate and the thrust plate are positioned in an opposing relationship with respect to each other. A continuous bearing gap 021, 022, 023 is formed between rotating shaft 011 with thrust plate 019, on one hand, and bearing sleeve 07 with the counter plate 018, on the other. Lubricant 012 is contained in this continuous bearing gap.

A radial fluid dynamic pressure generating groove 024 is formed on the inner circumferential surface of bearing sleeve 07. A first set of thrust fluid dynamic pressure generating grooves 025 is typically formed at the ceiling of the inner cavity of bearing sleeve 07 such that grooves 025 oppose the top surface of thrust plate 019. A second set of thrust fluid dynamic pressure generating grooves 026 is formed at the top surface of counter plate 018 such that grooves 026 oppose the bottom surface of thrust plate 019.

In the described bearing system, when rotating shaft 011 begins to rotate, dynamic pressure generating grooves 024, 025 and 026 generate fluid dynamic pressure gradients in the radial and thrust directions. The resulting fluid dynamic pressure suspends shaft 011 within the bearing space shaped by the surrounding bearing sleeve 07 and counter plate 018. The rotating shaft is supported by a lubricant film formed within the bearing gap.

A common concern with respect to the described system is that lubricant 012 contained within the continuous gap 021-023 may leak out of the bearing, specifically through the top opening of bearing sleeve 07. Several factors can contribute to the upsurge of the lubricant fluid level within the continuous bearing gap. For example, the upsurge may be caused by the expansion-contraction of the lubricant itself due to temperature change; by changes in the capacity level of a constructional element of the bearing due to the thermal expansion-contraction; by the pumping action at the time of starting and halting the operation of the spindle motor; and by the centrifugal force and pressure generated while the motor is running. There is typically a very small possibility of the leakage during shaft's rotation because of the in-pumping mechanism (the action by which the lubricant is drawn back into the bearing). However, the current problem in the art is that lubricant 012 can easily flow out of the opening of bearing sleeve 07 when the spindle motor is not operational, i.e., shaft 011 does not rotate, and an external force such as a shock or a vibration is applied to the spindle motor.

Instances of shock or vibrations are particularly common in portable computers, which are often dropped while being carried. Spindle motors used in such portable machines are thinner, lighter and smaller than spindle motors utilized in non-portable models. The risk of experiencing shocks and vibrations is much higher for such spindle motors. Therefore, there is a significant need for construction of shock-proof and vibration-proof models preventing the lubricant leakage.

Seal structure shown in FIGS. 12-15 attempting to prevent leakage of lubricating oil from a conventional fluid dynamic pressure bearing is typically called a "taper seal structure." In this conventional structure, taper surface 035 is provided along the inner surface of bearing sleeve 07 at the opening portion of the bearing gap (the opening portion of bearing sleeve 07). Taper surface 035 is inclined at a specific inclination angle α and thus gradually broadens the bearing gap towards the opening. Consequently, a gradually expanding gap portion 029 with a wide opening is formed at the top of the bearing gap. This gradually expanding gap portion 029 also serves as a reservoir of lubricating oil because lubricating oil which flows out of the bearing gap is received and contained within this reservoir by the surface tension. As shown in FIG. 14, the structure shown in FIGS. 12 and 13 can also be provided with a peripheral groove 036 formed inwardly to the taper surface 035 along the inner surface of bearing sleeve 07.

Similarly to the prior art bearing shown in FIG. 13, the above-mentioned Japanese Patent No. 2937833 discloses a gradually expanding modified gap portion with a wide opening formed within the bearing gap outside the radial bearing area, where an oil accumulating circumference groove (similar to the peripheral groove 036 of FIG. 13) is formed on the inner surface of the bearing sleeve. According to the disclosure of the '833 patent, the inclination angle α of the gradually expanding modified gap is set at 0° or greater. The fact that the angle of inclination α is set at 0° or greater indicates that a portion of bearing sleeve's inner wall within the modified gap region can be parallel to the rotating shaft.

As explained above, lubricating oil reservoir 029 of conventional fluid dynamic bearing 06 shown in FIGS. 12-15 has a general triangular shape and is formed as part of the expanding portion of the bearing gap. However, increasing the capacity of the reservoir having this configuration is limited to either increasing the angle of wall inclination α or increasing the length of the reservoir in the axial direction, i.e., increasing the depth of oil within the reservoir.

For smaller, thinner, and lighter spindle motors, the axial length of fluid dynamic bearings is shorter. If the axial depth of the modified expanded gap opening 029 is too large, the axial length of radial pressure generating area could be shorter than the length required to generate sufficient dynamic pressure to sustain the shaft. Therefore, restrictions are applied to the axial depth of the modified expanded gap opening 029 accumulating oil to prevent lubricant outflow. Specifically, the axial depth of the modified expanded gap opening 029 must stay within the range where it does not affect the axial length required for the pressure generating section of the bearing. The structure of thinner and lighter spindle motors also places restrictions on the inclination angle α of the bearing gap wall. Consequently, the above two considerations complicate the use of the modified expanded gap reservoir 029, in a smaller and thinner design of a fluid dynamic bearing requiring no lubricant leakage when a shock or vibration is applied to it.

Furthermore, in the shown conventional design of the lubricant outflow prevention structure, a modified expanded gap opening 029 is designed to reach a maximum size at the opening of the bearing sleeve 07, and there is no mechanism inhibiting the scattering outflow of the lubricant. Consequently, when the rotating shaft undergoes a shock or a vibration during its rest time, the lubricant inside the bearing gap of the fluid dynamic bearings cannot remain within the modified expanded gap opening 029 and splatters outside the bearing. Thus, the conventional structure allows the lubricant to scatter outside the modified expanded gap opening 029 and, consequently, outside of the bearing. (See FIG. 15.)

The lubricant leakage problem of the conventional spindle motor is a direct consequence of the fluid dynamic bearing design, where the capacity of a lubricant reservoir is limited due to a number of restricting factors and lubricant outflow can not be prevented. Additionally, in the conventional oil reservoir there is no prevention wall protecting the bearing against lubricant leakage when a shock or vibration is applied to the resting shaft. With the need to meet an increasing demand for smaller, thinner, and lighter spindle motors, the problem of making smaller and thinner, yet leak-proof, fluid dynamic bearings must be solved as soon as possible.

In addition to the above described conventional structure of a lubricant reservoir, Japanese Patent Publication No. 3431723 discloses a fluid dynamic bearing having a lubricant-filled gap between the sleeve and the rotating shaft and fluid dynamic pressure generating grooves, wherein a large diametric section is provided on the interior surface of the sleeve's opening and a circumferential groove is formed in the middle of the large diametric section of the sleeve. This structure attempts to control the outflow of lubricant oil and its scatter. However, the details of the structure of the circumferential groove and the large diametric part are not disclosed.

BRIEF SUMMARY

In one of its general aspects, the present invention is a fluid dynamic bearing having a bearing sleeve, a rotational shaft supported for rotation by the bearing sleeve, a bearing gap formed between the bearing sleeve and the rotational shaft, lubricating oil contained within the bearing gap, at least one hydrodynamic pressure-generating groove formed at an inner peripheral surface of the bearing sleeve; and an oil reservoir. The oil reservoir includes a gradually expanding section located in a position distanced from the pressure-generating groove and a first larger inner diameter section located adjacently to the gradually expanding section. A second larger inner diameter section, located immediately below an opening of the bearing sleeve, and an oil-repelling peripheral groove, located between the first larger inner diameter section and the second larger inner diameter section, are provided to prevent lubricating oil scattering and leaking outside the bearing gap. An opening of the oil-repelling peripheral groove gradually widens towards the inside of the bearing sleeve. A first side surface of the oil-repelling peripheral groove forms an oil splash back wall surface. The oil reservoir encloses the lubricating oil in a position where a non-operational fluid level of the lubricating oil is located within the first larger inner diameter section. The oil-repelling peripheral groove prevents overflow and scatter of the lubricating oil outside of the bearing gap even when an external force is applied to the fluid dynamic bearing.

The fluid dynamic bearing constructed in the above way allows to increase the desired capacity of the lubricant reservoir without increasing the axial size of the spindle motor. Restrictions that are placed on conventional models, such as the length decrease of the pressure generating part, are no longer applicable, making it possible to provide small and thin fluid dynamic bearings suitable for smaller, thinner, and lighter spindle motors.

Additionally, because one side surface of the oil-repelling peripheral groove serves as an oil splash back wall, even if the motor experiences an external force such as a shock or a vibration while the shaft is at rest, overflow and splattering of oil is prevented. Even without the in-pumping action, the lubricant is drawn back into the bearing gap by the oil splash back wall of the oil-repelling peripheral groove.

In accordance with one of the aspects of the present invention, the oil-repelling peripheral groove has an opening that gradually widens towards the inside of the bearing sleeve. This construction allows the upper surface of the peripheral groove to efficiently push the lubricant back into the interior of the bearing gap because the movement of the lubricant in the direction of the bearing gap is facilitated by the spread of the side surfaces of the peripheral groove.

In accordance with the present invention, the oil-repelling peripheral groove of the fluid dynamic bearing described above may include one side wall which is inclined with respect to the center axis of the bearing sleeve. The inclination angle formed by this side wall with the center axis is preferably an acute angle.

In yet another aspect of the present invention, the inner diameter of the second larger inner diameter section is smaller than the inner diameter of the first larger inner diameter section of the oil reservoir.

In a further aspect of the present invention, the first larger inner diameter section includes a taper gradually increasing the inner diameter of the section towards the opening of the bearing sleeve. In the bearing constructed in accordance with this aspect of the invention, it is possible to substantially increase the capacity of the lubricant reservoir without increasing the axial size of the bearing and to acquire a structure where air bubbles that gets mixed in with the lubricant can easily escape from the bearing gap.

In another aspect of the present invention, a solid film of an oil repelling agent is applied to the top surface of the bearing sleeve along its opening edge. Another solid film of an oil repelling agent is applied to an outer peripheral surface of the rotational shaft immediately above the opening of the bearing sleeve.

Consequently, even if by chance the lubricant did leak out of the opening of the bearing gap, this lubricant would be pushed back by the solid-film oil repelling agent.

In its another general aspect, the present invention is a spindle motor including a fluid dynamic bearing having a bearing sleeve, a rotational shaft supported for rotation by the bearing sleeve, a bearing gap formed between the bearing sleeve and the rotational shaft, lubricating oil contained within the bearing gap, at least one hydrodynamic pressure-generating groove formed at an inner peripheral surface of the bearing sleeve; and an oil reservoir. The oil reservoir includes a gradually expanding section located in a position distanced from the pressure-generating groove and a first larger inner diameter section located adjacently to the gradually expanding section. A second larger inner diameter section, located immediately below an opening of the bearing sleeve, and an oil-repelling peripheral groove, located between the first larger inner diameter section and the second larger inner diameter section, are provided to prevent lubricant oil scattering and leakage. An opening of the oil-repelling peripheral groove gradually widens towards the inside of the bearing sleeve. A first side surface of the oil-repelling peripheral groove forms an oil splash back wall surface. The oil reservoir encloses the lubricating oil in a position where a non-operational fluid level of the lubricating oil is located within the first larger inner diameter section. The oil-repelling peripheral groove prevents overflow and scatter of the lubricating oil outside of the bearing gap even when an external force is applied to the fluid dynamic bearing.

In its another general aspect, the present invention is a recording disk drive device having a recording disk, a data head writing and/or reading data onto/from the recording disk and a spindle motor rotating the recording disk and having a fluid dynamic bearing constructed in a way described above. The data head may be a magnetic or an optical head.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which:

FIG. 1 is a vertical cross sectional view of the spindle motor in accordance with the first embodiment of the present invention.

FIG. 2 is a vertical cross sectional view of the stator assembly of the spindle motor of FIG. 1.

FIG. 3 is a vertical cross sectional view of the fluid dynamic bearing utilized in the spindle motor of FIG. 1.

FIG. 4 is a partial enlarged view of the fluid dynamic bearing of FIG. 3.

FIG. 5 is a partial enlarged view of the fluid dynamic bearing of FIG. 3 illustrating operation of the lubricant repelling circumferential groove formed on the inner surface of the bearing sleeve.

FIG. 6 is a partial enlarged vertical cross sectional view of the fluid dynamic bearing constructed in accordance with the second embodiment of the present invention.

FIG. 7 is a partial enlarged vertical cross sectional view of the fluid dynamic bearing wherein the lubricant repelling circumferential groove has an arc shape.

FIGS. 8a-8c show assembly positions of the conventional spindle motor on the testing device, where "p" represents atmospheric pressure and "g" represents gravity.

FIG. 9 shows one example of the assembly position of the first embodiment of the spindle motor on the testing device, where "g" represents gravity.

FIG. 10 is a table illustrating the results of the comparative test.

FIG. 11 shows a longitudinal cross-sectional schematic view of the structure of a hard disk drive according to the third embodiment of the present invention.

FIG. 12 is a vertical cross sectional view of the fluid dynamic bearing used in a conventional spindle motor.

FIG. 13 is a partial enlarged vertical cross sectional view of the conventional fluid dynamic bearing of FIG. 12.

FIG. 14 is a partial enlarged vertical cross sectional view of another example of a conventional fluid dynamic bearing.

FIG. 15 is a partial enlarged vertical cross sectional view of the fluid dynamic bearing of FIG. 14 schematically illustrating operation of this conventional fluid dynamic bearing.

DETAILED DESCRIPTION

In accordance with the preferred embodiment of the present invention, a fluid dynamic bearing assembly includes a rotational shaft supported for rotation within a bearing sleeve, such that a bearing gap is formed between the rotational shaft and the inner surface of the bearing sleeve. Lubricating oil is enclosed in the bearing gap between the bearing sleeve and the rotational shaft. At least one fluid dynamic pressure generating groove is formed at the inner surface of the bearing sleeve. The bearing sleeve includes a first larger inner diameter section facing the opening of the sleeve. This first larger inner diameter section is located in a position removed from one end of the fluid dynamic pressure generating groove such that the first larger inner diameter section does not interfere with operation of the pressure-generating groove. A second larger inner diameter section is formed immediately below the opening of the bearing sleeve. An oil-repelling peripheral groove is formed between the first larger inner diameter section and the second larger inner diameter section. The oil-repelling peripheral groove has a greater inner diameter than inner diameters of the first and second larger inner diameter sections. Additionally, the bottom surface of the second larger inner diameter section forms a splash-preventing back wall inhibiting accidental splashing of the lubricant. The lubricant is preferably filled to a point wherein, when the shaft is stationary, the fluid level is in the first larger inner diameter section. Therefore, it is possible to insure that an increase in the volume of lubricating oil that could result in splashing and scattering does not overflow the oil-repelling peripheral groove, even if an external force, shock or vibration is applied, or if the equilibrium of the capillary force, the surface tension, and atmospheric pressure is disrupted.

At least the area surrounding the edges of one side surface of the oil-repelling peripheral groove forms a sharp angle with the central axis of the bearing sleeve. In the preferred embodiment, the inner diameter of the second larger inner diameter section is smaller than the inner diameter of the first larger inner diameter section. A solid film of an oil repelling agent is applied to the end surface of the bearing sleeve along the edge of the sleeve's opening. Additionally, a solid film of an oil repelling agent is also applied to the outer peripheral surface of the rotational shaft in immediately above the bearing sleeve's opening.

Next, a first preferred embodiment of the present invention will be explained with reference to FIGS. 1-5.

FIG. 1 shows a spindle motor 1 of the first embodiment (hereinafter the "motor 1") utilized for driving a disk memory device, for example, a magnetic disk or an optical disk, used in a computer (where it is often termed "a recording disk drive device"). Spindle motor 1 includes a stator assembly 2 and a rotor assembly 3. Stator assembly 2 has a frame 4 rigidly affixed to the body of the data recording device. Stator stack 8 having a coil winding 9 is mounted on the outer peripheral surface of a vertically extending cylindrical portion 5 of the center section of frame 4.

Rotor assembly 3 has a hub 10 rigidly attached to the top end portion of a rotational shaft 11 and rotating with rotational shaft 11. Rotational shaft 11 is inserted into a bearing sleeve 7 and is rotatably supported by the bearing sleeve. Bearing sleeve 7 is fitted into and is rigidly attached to the inner peripheral wall of the cylindrical portion 5. Hub 10 includes a lower cylindrical portion 10a rotating inside frame 4 and a yoke 13 mounted on the inner peripheral surface of the lower cylindrical portion 10a. Magnet 14 is secured to the inside of yoke 13 and includes multiple north and south poles.

When power is supplied to the coil 9, a magnetic field is generated by the stator stack 8. This generated magnetic field acts on magnet 14 disposed within the magnetic field, causing the rotor assembly 3 to rotate. A rotating recording disk, such as a magnetic or an optical disk (not shown), is secured on the outer peripheral surface of an intermediate cylinder portion 15 of hub 10. The disk is rotated and stopped by the spindle motor 1, and writing and/or reading data processing is performed by a data head, which can be a magnetic or an optical head.

In the spindle motor 1 according to the first embodiment, a fluid dynamic bearing 6 is formed in the area where the bearing sleeve 7 supports the rotational shaft 11. A detailed description of the structure of the fluid dynamic bearing 6 is provided below.

As is shown in FIGS. 1-3, the bottom portion of the bearing sleeve is provided with a first cavity 16 having a large-diameter downwardly facing opening and second cavity 17 located immediately above the first cavity. The inner diameter of the second cavity is preferably smaller than the inner diameter of the first cavity. A counter plate 18 is fitted into the first cavity 16 and is fixedly secured therein by welding, an adhesive, or the like so that the inside of bearing sleeve 7 is in an air-tight state.

A thrust plate 19 is press fitted and securely fastened to the bottom end of rotational shaft 11. When the shaft with the thrust plate is inserted into the bearing sleeve, thrust plate 19 is disposed within the second cavity 17 of bearing sleeve 7. Thus, the bottom surface of the thrust plate faces counter plate 18 and the top surface of the thrust plate top faces the ceiling of the second cavity 17. Multiple connection channels 20 are uniformly spaced around the inner periphery of the thrust plate adjacent to the rotational shaft 11.

As shown in FIG. 3, a first bearing gap 21 is formed between bearing sleeve 7 and rotational shaft 11, the second bearing gap 22 is formed between thrust plate 19 and the ceiling of second cavity 17, and the third bearing gap 23 is formed between thrust plate 19 and counter plate 18. Bearing gaps 21, 22 and 23 are mutually continuous with each other and are filled with lubricating oil 12. Lubricating oil 12 is injected into the gap between bearing sleeve 7 and rotational shaft 11. First bearing gap 21 is interposed between second bearing gap 22 and a lubricating oil reservoir 29 (described below), and is a straight gap having a uniform width dimension along its entire axial length.

Lubricating oil reservoir 29, which is a distinctive characteristic of the present invention, is formed at the uppermost portion of the bearing sleeve, between bearing sleeve 7 and the rotational shaft 11. Lubricating oil reservoir 29 is a gap with a particular structure that serves as the opening portion of the continuous gaps 21, 22 and 23 and seals the lubricant within these continuous gaps.

A first fluid dynamic pressure generating groove 24 is formed at the inner cylindrical surface 27 of the bearing sleeve 7. First fluid dynamic pressure generating groove 24 generates dynamic pressure that sustains a load in the radial direction from the rotation of the rotational shaft 11. First fluid dynamic pressure generating groove 24 is preferably placed at two locations, an upper location and a lower location, on the inner cylindrical surface 27 of the sleeve 7. Both locations of the groove 24 are positioned below the lubricating oil reservoir 29.

A second fluid dynamic pressure generating groove 25 is formed at the ceiling surface of the second cavity 17 facing the top surface of thrust plate 19. A third fluid dynamic pressure generating groove 26 is formed at the top surface of counter plate 18 facing the bottom surface of thrust plate 19. The second and third fluid dynamic pressures generating grooves 25 and 26 generate the dynamic pressure, resulting from the rotation of rotational shaft 11, that bears the load in the thrust direction.

Rotational shaft 11 is supported in the radial and the thrust directions by the dynamic pressure generated by the first, second and third fluid dynamic pressure generating grooves 24, 25 and 26. Consequently, the shaft rotates relative to the bearing sleeve and the counter plate in a floating state.

As shown in FIGS. 3-5, lubricating oil reservoir 29 is a space including a gradually expanding portion 33 and a first larger inner diameter section 31a. The oil is filled into the bearing gap to ensure that the oil level is positioned within the volume of the first larger inner diameter section 31a. An oil-repelling peripheral groove 32 and a second larger inner diameter section 31b are provided immediately above the oil reservoir 29 to prevent oil scattering and leaking resulting from application of an external force such as a shock or a vibration. All parts of the lubricating oil reservoir and the oil scattering and leaking prevention structure are formed within the upper portion of the inner surface 27 of bearing sleeve 7. In present invention, this entire structure is referred as straight seal structure.

The gradually expanding portion 33 is formed on the inner surface 27 above the position designated as "m" in FIG. 4 and expands towards the opening of the bearing sleeve, designated as "w". Position "m" is distanced by a prescribed space interval from the upper first fluid dynamic pressure generating groove 24.

First larger inner diameter section 31a is formed on the inner surface 27 immediately above the gradually expanding portion 33. The inner diameter of first larger inner diameter section 31a is constant along the axial direction of bearing sleeve 7.

As shown in the cross-sectional view of FIG. 4, the oil-repelling peripheral groove 32 forms a U shape oriented essentially sideways. Second larger inner diameter section 31b is formed above the oil-repelling peripheral groove 32. One side of the U-shaped peripheral groove 32, designated with numeral "32b", is located adjacently to the second larger inner diameter section 31b and forms a lubricating oil splash back wall surface that is substantially perpendicular to the axis of the bearing sleeve 7. The other side surface 32a of the U-shaped peripheral groove 32 is located adjacently to the first larger inner diameter section 31a and forms an angle with the axis of the bearing sleeve. The angle at which the side surface 32a is inclined with respect to the central axis is preferably less than the inclination angle of the side surface 32b. In other words the inclination angle of the side surface 32a is less than 90°, i.e., an acute angle. The result is that the oil-repelling peripheral groove 32 has an opening widening in towards the inside of the bearing sleeve. The central axis of the bearing sleeve 7 matches the central axis of the rotational shaft 11 when the rotational shaft 11 is correctly positioned inside the bearing sleeve 7.

Second larger inner diameter section 31b expands from the upper edge of the oil-repelling peripheral groove 32 to the upper edge 28 of the bearing sleeve. Normally, in consideration of manufacturability, the first larger inner diameter section 31a and the second larger inner diameter section 31b have the same diameter, and are parallel with the inner surface 27 of the bearing sleeve 7.

The angle formed by side surface 32a of the oil-repelling peripheral groove 32 with the central axis of the bearing sleeve 7 is tilted, as described above. Therefore, the shape of the peripheral groove 32 accelerates the flowing out movement of the lubricating fluid and energizes the movement of the fluid to strike against the side surface 32b. Side surface 32b uses the reaction of this energized impact to push lubricating oil 12 back in the direction towards the inside of the bearing, to effectively control overflowing of lubricating oil 12. (See FIG. 5.)

The cross-sectional shape of the oil-repelling peripheral groove 32 is not limited to an essentially U shape. It can also be an essentially semicircular shape, an essentially arc shape, an essentially rectangular shape, an essentially trapezoidal shape, an essentially triangular shape, or the like. However, in any of these different shape cases, the opening part of the peripheral groove should be widening towards the inside of the bearing sleeve and at least a portion of surfaces 32a and 32b should be substantially flat in the radial direction in the vicinity of the edges.

Note that, in some embodiments, the cross-section of the oil-repelling peripheral groove 32 may either be essentially U-shaped or essentially rectangular-shaped. Therefore, the oil-repelling peripheral groove may be referred to by either term. When the cross-section is essentially semicircular-shaped or arc-shaped, the side surface 32b and the side surface 32a are the regions corresponding to the arc portions where a jet water flow, jetted along a normal line extending from any point on the arc portions and reflected symmetrically by the outer peripheral surface of the rotational shaft 11, escapes outside of the oil-repelling peripheral groove 32.

As shown in FIGS. 4 and 5, the fluid level SO of lubricating oil 12 is located in the first larger inner diameter section 31a when rotational shaft 11 is stationary, and the lubricating oil 12 is present within the bearing gap. As described above, lubricating oil 12 can scatter and leak out if the motor 1 is subjected to external forces such as an external impact or a vibration, and if the equilibrium between the capillary force, the surface tension, and atmospheric pressure is disrupted. In the presently provided fluid dynamic bearing, the lubricating oil is enclosed, so as to not overflow the oil-repelling peripheral groove 32. When the rotational shaft 11 is stationary there is no in-pumping effect, so when the motor 1 is subjected to an external force such as an external shock or a vibration, the lubricating oil that is filled into the continuous gaps can be scattered and leak out in a relatively large amount from the opening part. However, the oil-repelling peripheral groove 32 receives a relatively large amount of lubricating oil and pulls it down, back into the bearing, due to the geometry of side surface 32b. The presently described construction of the fluid dynamic bearing is also effective when the spindle motor is subjected to outside forces like sudden changes in temperature and pressure in addition to the external shocks and vibrations.

A solid layer 30a of an oil repelling agent is applied to the edge of top surface 28 of the opening of the bearing gap "w". Another solid layer 30b of an oil repelling agent is applied to the outer peripheral surface of the rotational shaft 11 above the bearing gap opening "w". These solid films 30a and 30b prevent the leakage or scattering of lubricating oil 12 to the outside of the bearing gap by repelling back lubricating oil 12 in the unlikely event that it reaches the gap opening "w".

Next, the action of the oil-repelling peripheral groove 32 and the effects of the first embodiment will be explained.

When rotational shaft 11 is stationary, the fluid level SO of lubrication oil 12 is located in the first larger inner diameter section 31a, as shown in FIG. 4. When motor 1 is subjected to an external force disrupting the equilibrium state of the fluid level SO, some amount of the lubricating fluid will rise and will be pulled into the inner void of the oil-repelling peripheral groove 32. The fluid level of the lubricant will continue to rise until it will be positioned against the side surfaces 32a and 32b. Side surface 32b then performs as a lubricating oil splash back wall and repels lubricating oil 12 pushing it back inside the bearing gap, as shown in FIG. 5. In this way, scattering and leakage of lubricating oil 12 to the outside of the bearing is prevented.

Side surface 32a of the oil-repelling peripheral groove 32, at least in the vicinity of its edge, forms an acute angle with the center axis of the bearing sleeve that is smaller than the 90° angle that side surface 32b forms with the same axis. Therefore, the movement of the lubricant out of the peripheral groove is accelerated and energized compared with the construction where the same side surface forms a right angle with the center axis. When lubricating oil 12 strikes the side surface 32b, and the side surface 32b uses the reaction of this impact to push lubricating oil 12 back into the bearing gap, overflow of the lubricant is effectively suppressed.

Even in the unlikely event that an external shock or vibration stronger than that which as been anticipated is received by the spindle motor 1, and the fluid level SO rises above the side surface 32b and reaches the opening position "w", oil-repelling action of solid films 30a and 30b will drive the oil back in the direction of the bearing gap, preventing lubricating oil 12 from splashing or leaking to the outside of the bearing.

Depending on the selection of the dimensions for the inner diameter of the first larger inner diameter section 31a, the volume of the oil reservoir 29 can be increased without increasing the axial dimension of the entire bearing. Because the first larger inner diameter section 31a is straight, this structure is much simpler than the conventional taper seal structure. Additionally, the problem of reducing the space for the dynamic pressure generating grooves, as occurred in conventional seal structure, is eliminated by the structure of this lubricating oil reservoir 29. Consequently, it is possible to secure an adequate volume of the lubricating oil reservoir and to further increase the effect of preventing the lubricating oil 12 from scattering and leaking to the outside of the bearing, as described above.

The effects of the first embodiment of the present invention, described above, have been confirmed experimentally. The experimental results are summarized in the table of FIG. 10 and will be explained below.

FIG. 10 shows the results of comparative tests on the lubricating oil scatter and leak prevention effects, for different levels of impact load applied in a non-operational state. The tests were conducted for a taper seal structure used in a conventional fluid dynamic bearing construction, as shown in FIGS. 12-14, and a straight seal structure used in the fluid dynamic bearing 6 formed in the spindle motor 1.

As the test conditions, in the comparative tests, the considered orientations for the assembly position of the spindle motors relative to the test device were: the upwardly facing direction, the downwardly facing direction and a sideways facing direction, as shown in FIGS. 8(a)-8(c) for conventional taper seal structure and in FIG. 9 for straight seal structure in sideways facing orientation, The "facing upwards," "facing downwards," and "facing sideways" for the assembly orientations indicate that the opening of the sleeve of the fluid dynamic pressure bearing is facing upwards, downwards, or sideways. The tests were performed by applying the impact in the direction from the top to the bottom, where the magnitude of the impact measured in terms of the magnitude of the acceleration was divided into five levels from 100 G to 1000 G. Therefore, a total of 15 types of tests were conducted for each test sample. Because the amount of lubricating oil that leaks out from the fluid dynamic bearing depends on the magnitude of the impact or vibration, and on the orientation of the fluid dynamic pressure bearing relative to the direction of the shock or vibration, the above test method was defined to take these factors into account.

For the test sample representative of the present invention, three spindle motors with the same straight seal structure (No. 1 through No. 3) were prepared, and each of the test samples was repeatedly subjected to the 15 types of shock tests. For the comparative samples corresponding to the conventional taper seal structure, five spindle motors of identical taper seal structures (No. 1 through No. 5) were prepared and, similarly to the straight seal test samples, were individually subjected to the 15 types of impact tests.

Note that, for each sample, the test was performed by applying the smallest level of shock first and sequentially proceeding to the largest level of shock. Additionally, for a given shock level (acceleration level), the assembly orientation was changed in sequence of upward orientation, downward orientation and sideways orientation. This sequence of assembly positions as the test procedure was adopted because the conditions to maintain the stability of the lubricating oil in the fluid dynamic bearing mounted in the spindle motor became more severe in this sequence. This is better understood by referring to FIG. 8(c). In the sideways orientation as shown in FIG. 8(c), the load of total weight of the lubricating oil concentrates on the lowest part SL of the oil surface (meniscus). Therefore the equilibrium between the capillary forces, the surface tension, and the atmospheric pressure p, which is responsible to maintain stability of the oil surface (meniscus) and keep the oil inside the bearing gap, is most easily disrupted at the oil surface lowest part SL. For the case in FIG. 9, showing the embodiment of the present invention, even if the equilibrium was similarly disrupted, the leakage would still be prevented through the capture of the lubricant by the oil-repelling peripheral groove. Considering that the severity for oil leakage or scattering increases in the same sequence of the tests, for each sample, once an oil leakage was verified, the remaining tests were not performed because the results for subsequent tests were evident.

The result of the tests is clear from the table of FIG. 10. The samples with conventional taper seal structure could not withstand the 1000 G impacts, and leaked the lubricating oil. However, the samples with the straight seal structure according to the first embodiment of the present invention were able to withstand the shocks of 1000 G or more, regardless of the assembly orientation, proving the superiority over the conventional taper seal structure. All test samples confirmed the superiority of present invention by showing the effect of preventing the scatter and leakage of the lubricating oil when receiving aforementioned impact loads with the rotational shaft in stationary condition. In the table of FIG. 10, the word "o.k." indicates that oil leak did not happen, the phrase "oil leak" indicates that oil leaks were actually confirmed in the test, and the hyphen ("-") indicates that the test was not performed but it was evident that an oil leak would have occurred in the test.

Moreover, additional comparative vibration test between the conventional taper seal structure, used for preventing the scattering and leakage of the lubricating oil in the fluid dynamic pressure bearing formed in a conventional spindle motor, and the straight seal structure, used for the same purpose in the fluid dynamic pressure bearing 6 formed in the spindle motor 1 of the first embodiment of the present invention, were performed to verify the capability of preventing the scatter and leaking of the lubricating oil under a repetitively applied vibration with shaft in the stationary condition. The test showed that the oil scattering and leaking occurs in the taper seal structure, while it is reliably prevented in the straight seal structure according to the present invention. One example of specific vibration test conditions that are applied repetitively with the stationary shaft, is the applied acceleration range of 2.0 G rms to 5.0 G rms, the vibration frequency range and sweep condition of 10 Hz to 2000 Hz/30 minutes, and assembly orientations in the upwards, downwards, and sideways directions.

Furthermore, the results of tests verifying the capability of the seal structure to prevent the scattering and leakage of lubricating oil resulting from sudden changes in temperature and pressure, and the results of air involution during operation tests confirmed that the capability of the straight seal structure to prevent the scattering and leakage of lubricating oil is the same or better than that of the taper seal structure. The tests for sudden changes in temperature and pressure were performed with a stationary shaft, on a taper seal structure in a fluid dynamic pressure bearing formed in a conventional spindle motor, and the straight seal structure of the fluid dynamic pressure bearing 6 formed in the spindle motor 1 of the first embodiment. The test for air involution were performed rotating the shaft also on the taper seal structure and the straight seal structure.

When the straight seal structure according to the first embodiment of the present invention is compared to the conventional taper seal structure in the manner described above, it is clear that the straight seal of this invention has a considerably improved capability to prevent the scatter and leakage of the lubricating oil in a fluid dynamic pressure bearing, and the same or superior performance characteristics in terms of the capability to prevent the involution of air. Additionally, the presently disclosed and claimed straight seal structure allows for a reduced size and high reliability of the fluid dynamic bearing. Considering that the possibility of imparting a vibration or an impact by mishandling increases in a small-sized computer device, and further considering that spindle motors mounted in such devices are becoming smaller, slimmer and lighter, preventing the scattering and leakage of lubricating oil becomes a much bigger problem of today's fluid dynamic pressure bearings than increasing their stiffness. The straight seal structure of the first embodiment brings an important contribution to solving such problem.

Note that it is possible to set the inner diameter of the second larger inner diameter section 31b according to the shape of the oil-repelling peripheral groove 32, to optimize the effects of the side surface 32b as the lubricating oil splash back wall surface as a modified embodiment of the first embodiment. For example, when the effects of the side surface 32b are not enough as the lubricating oil splash back wall surface, the inner diameter of the second larger inner diameter section 31b may be set smaller than the inner diameter of the first larger inner diameter section 31a. However, the inner diameter of the second larger inner diameter section 31a can only be decreased as long as there is no risk of contact with the outer peripheral surface of the rotational shaft 11. Moreover, considering the magnitude of impact or considering the structure of fluid dynamic bearing, the inner diameter of the second larger inner diameter section 31b may be set, conversely, to be larger than the inner diameter of the first larger inner diameter section 31a.

In the example described above, setting the inner diameter of the second larger inner diameter section 31b to be smaller than the inner diameter of the first larger inner diameter section 31a not only further enhances the effect of preventing the scattering and leakage of the lubricating oil in the gap formed between the inner peripheral surface of the second larger inner diameter section 31b and the outer peripheral surface of the rotational shaft 11, but also provides the effect of reducing the involution of air. Lubricating oil 12 that would scatter and leak to the outside of the bearing by passing from the first larger inner diameter section 31a through the oil-repelling peripheral groove 32 and the second larger inner diameter section 31b is effectively pushed back into the bearing gap by the side surface 32b of the oil-repelling peripheral groove 32. The oil-repelling peripheral groove 32 is connected to the second larger inner diameter section 31b and is widened in the radial-direction towards the inside of the bearing sleeve, thus preventing the overflowing outside from the first side surface 32b. In addition, the effect of constricting the second larger inner diameter section 31b helps to control the overflow of the lubricating oil 12, thus the leakage is more effectively prevented, making it possible to additionally improve the reliability of the performance in preventing the scattering and leakage of the lubricating oil in the small and thin sized fluid dynamic pressure bearings.

Furthermore, in another modified example of the first embodiment, instead of keeping the inner diameter of the first larger inner diameter section 31a constant along its axial direction, a slight inclination relative to the rotational shaft 11 (i.e., a taper) may be provided in the axial direction for insuring the necessary volume to the lubricating oil reservoir 29 as well as for facilitating the escape of air mixed in lubricating oil. Additionally, such tapered configuration will reduce the flow path resistance. The inclination in this case may be either an inclination that gradually reduces or that gradually increases the inner diameter as moving toward the opening "w". When the inclination is so that it gradually decreases the inner diameter, it is easier to secure the volume of the lubricating oil reservoir 29, and also the air escapes easier. In this case, the inner diameter of the second larger inner diameter section 31b may also be smaller than the inner diameter at the end of the taper.

Embodiment 2

Next, the second embodiment of the present invention, as shown in FIGS. 6 and 7, will be explained.

FIG. 6 is a partial enlarged vertical cross sectional view of a fluid dynamic bearing according to the second embodiment, wherein the cross-sectional shape of the lubricating oil-repelling peripheral groove 32 is essentially trapezoidal and wherein the one side surface 32b forms an acute angle with the central axis of the sleeve 7. FIG. 7 is a similar figure wherein the cross-sectional configuration is essentially arc-shaped.

In FIG. 6, the cross-sectional shape of the lubricating oil-repelling peripheral groove 32 of the fluid dynamic pressure bearing 6 that is applied to the spindle motor 1 as the second embodiment is essentially trapezoidal. Furthermore, one side surface 32b is provided to work as a lubricating oil splash back wall surface that repels back lubricating oil 12 towards the inside of the bearing in order to suppress the scatter and leakage of the lubricating oil 12 to the outside of the bearing. Thus, the line tangent to at least the vicinity of the edge of the one side surface 32b intersects the center axis of the bearing sleeve 7 at a point P to form an acute angle α with the central axis, when viewed from the inside of the lubricating oil-repelling peripheral groove 32.

Moreover, according to the second embodiment, the axial length of the first larger inner diameter section 31a is substantially larger than the axial length of the second larger inner diameter section 31b. Alternatively, the radius of the second larger inner diameter section 31b may be smaller than the radius of the first larger inner diameter section 31a by an amount X in order to improve the effect of preventing the scattering and leakage of the lubricating oil 12 to the outside of the bearing (see the broken line). The other details are the same as in the first embodiment.

According to the present second embodiment, one side surface (the lubricating oil splash back wall surface) 32b of the lubricating oil-repelling peripheral groove 32, has an end portion that includes at least an area around the edge that forms an acute angle α with the center axis of the bearing sleeve 7. Therefore, lubricating oil 12 that would leak to the outside of the bearing passing from the first larger inner diameter section 31a through the lubricating oil-repelling peripheral groove 32 and the second larger inner diameter section 31b is reliably repelled and pushed back inside the bearing by the side surface 32b, thereby controlling overflowing of lubricating oil 12. Consequently, compared with the first embodiment, the scattering and leaking of lubricating oil 12 is more effectively prevented, and the performance to prevent the scattering and the leaking of the lubricating oil and its reliability in a smaller and thinner fluid dynamic bearing 6 are further improved.

The sectional shape of the lubricating oil-repelling peripheral groove 32 according to the second embodiment as shown in FIG. 7 is essentially a circular arc shape. Moreover, the gradually expanding portion 33 also has a gradual arc shape. The side surface 32b and the second side surface 32a of the lubricating oil stop peripheral groove 32 open facing in the direction of the rotational shaft 11 in a symmetric way. The angle formed by the center axis of the bearing sleeve 7 and the line tangent to the surface of the end of the side surface 32b, and the angle formed by the center axis of the bearing sleeve 7 and the line tangent to the surface of the start of the second side surface 32a are equal when viewed from the inside of the lubricating oil-repelling peripheral groove 32.

Aside from the above described aspects, the structure of FIG. 7 is same as the structure of the lubricating oil reservoir 29 and the anti-splattering structure shown in FIG. 6, and accordingly the similar results can be obtained.

Embodiment 3

Next, a third embodiment of the present invention, shown in FIG. 11, will be explained. FIG. 11 is a longitudinal cross-sectional schematic view showing a structure of a hard disk drive according to the third embodiment of present invention. As shown in FIG. 11, a hard disk drive 40 is provided with the spindle motor 1 of the first embodiment. Hard disk drive 40 of the third embodiment is structured as outlined below. The casing of the hard disk drive 40 comprises a housing 41, which houses the spindle motor 1, and a cover member 42, which seals the inside of said housing 41 to form a clean chamber having no contaminants which can interfere with the work of a recording disk. Spindle motor 1 is fixed to the housing 41 by fitting a central cylindrical portion 4a of the frame 4 into an attachment hole 41a of the housing 41, and fastening to the housing 41 with several attachment screws 52 passed through, multiple through holes provided around the outer peripheral part of the frame 41. The main part of spindle motor 1 which includes the stator 2 and the rotor 3, is housed inside the casing of the hard disk drive 40.

Alternatively, it is possible to integrate the frame 4 and the housing 41 into a single base member, where the base member includes both the attachment part for attaching the fluid dynamic pressure bearing 6 and the stator 2 of the spindle motor 1 and one of the parts of the casing of the hard disk drive 40.

Two hard disks (magnetic recording disks) 43 are mounted on the outer peripheral surface of the intermediate cylindrical portion 15 of the hub 10 of the rotor 3. Hard disks 43 are securely fastened to the hub 10 by the clamp member 44 fixed with multiple attachment screws 51 screwed into multiple screw holes provided in the axial direction on the intermediate stage of the hub 10. Thus, hard disks 43 rotate along with the hub 10. Although the embodiment shown in FIG. 11 comprises two hard disks 43 mounted on the hub 10, the quantity of hard disks 43 is not limited to two.

Hard disk drive 40 is further provided with magnetic heads 45 that read and/or write data from/to hard disk 43, arms 46 which support magnetic heads 45, and a voice coil motor 48 that moves magnetic heads 45 and arms 46 to a specific position. The voice coil motor 48 has a coil 49, and a magnet 50 disposed to face the coil 49. Magnetic heads 45 are attached to the distal ends of suspensions 47 fixed to arms 46 which in turn are rotatably supported at an appropriate position in the housing 41. A pair of magnetic heads 45 is disposed facing respectively each side of one hard disk 43, making it possible to read and write data to both sides of the hard disk 43. In the embodiment of FIG. 11, two pairs of magnetic heads 45 are provided because there are two hard disks 43. Moreover, in the embodiment of FIG. 11, hard disk device 40 is constructed as having the spindle motor 1. However, the present invention is not limited to the application shown in FIG. 11. For example, spindle motor 1 may be applied to a recording disk drive having a different data head (e.g., an optical head) instead of the magnetic head 45 and driving an optical recording disk such as a CD or a DVD.

The hard disk drive 40 according to third embodiment, structured as described above, is a substantial improvement over the conventional fluid dynamic bearing technology in terms of preventing the scattering and leaking of the lubricating oil and preventing the involution of air for the fluid dynamic pressure bearing 6, and, in particular, when used in a small portable computer device, the hard disk drive 40 can insure higher level of reliability even receiving unexpected shocks or continuous vibration when this small portable computer device is carried.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

I claim:

1. A hydrodynamic bearing comprising:
    a bearing sleeve;
    a rotational shaft supported for rotation by said bearing sleeve;
    a bearing gap formed between said bearing sleeve and said rotational shaft;
    lubricating oil contained within said bearing gap;
    at least one hydrodynamic pressure-generating groove formed at an inner peripheral surface of said bearing sleeve;
    an oil reservoir further comprising a gradually expanding section located in a position distanced from said at least one pressure-generating groove and a first larger inner diameter section located adjacently to said gradually expanding section;
    a second larger inner diameter section located immediately below an opening of said bearing sleeve; and
    an oil-repelling peripheral groove located between said first larger inner diameter section of said oil reservoir and said second larger inner diameter section,
    wherein an opening of said oil-repelling peripheral groove gradually widens towards the inside of said bearing sleeve, wherein a first side surface of said oil-repelling peripheral groove forms an oil splash back wall surface, wherein said lubricating oil is filled to a position where a non-operational fluid level of said lubricating oil is located within said first larger inner diameter section, and wherein a configuration of said first side surface of said oil-repelling peripheral groove prevents overflow and scatter of said lubricating oil beyond said first side surface of said oil-repelling peripheral groove even when an external force is received by said hydrodynamic bearing.

2. The hydrodynamic bearing according to claim 1, wherein a line tangent to at least a portion of said first side surface of said oil-repelling peripheral groove forms an acute angle with a central axis of said bearing sleeve when viewed from inside of said oil-repelling peripheral groove.

3. The hydrodynamic bearing according to claim 1, wherein an inner diameter of said second larger inner diameter section is smaller than an inner diameter of said first larger inner diameter section.

4. The hydrodynamic bearing according to claim 1, wherein said first larger inner diameter section further comprises a taper gradually increasing an inner diameter towards the opening of said bearing sleeve.

5. The hydrodynamic bearing according to claim 1, wherein a solid film of an oil repelling agent is applied at a top surface of said bearing sleeve along its opening edge, and wherein a solid film of an oil repelling agent is applied to an outer peripheral surface of said rotational shaft immediately above said opening of said bearing sleeve.

6. A spindle motor having a hydrodynamic bearing comprising:
a bearing sleeve;
a rotational shaft supported for rotation by said bearing sleeve;
a bearing gap formed between said bearing sleeve and said rotational shaft;
lubricating oil contained within said bearing gap;
at least one hydrodynamic pressure-generating groove formed at an inner peripheral surface of said bearing sleeve;
an oil reservoir further comprising a gradually expanding section located in a position distanced from said at least one pressure-generating groove and a first larger inner diameter section located adjacently to said gradually expanding section;
a second larger inner diameter section located immediately below an opening of said bearing sleeve; and
an oil-repelling peripheral groove located between said first larger inner diameter section of said oil reservoir and said second larger inner diameter section,
wherein an opening of said oil-repelling peripheral groove gradually widens towards the inside of said bearing sleeve, wherein a first side surface of said oil-repelling peripheral groove forms an oil splash back wall surface, wherein said lubricating oil is filled to a position where a non-operational fluid level of said lubricating oil is located within said first larger inner diameter section, and wherein a configuration of said first side surface of said oil-repelling peripheral groove prevents overflow and scatter of said lubricating oil beyond said first side surface of said oil-repelling peripheral groove even when an external force is received by said hydrodynamic bearing.

7. The spindle motor according to claim 6, wherein a line tangent to at least a portion of said first side surface of said oil-repelling peripheral groove forms an acute angle with a central axis of said bearing sleeve when viewed from inside of said oil-repelling peripheral groove.

8. The spindle motor according to claim 6, wherein an inner diameter of said second larger inner diameter section is smaller than an inner diameter of said first larger inner diameter section.

9. The spindle motor according to claim 6, wherein said first larger inner diameter section further comprises a taper gradually increasing an inner diameter towards the opening of said bearing sleeve.

10. The spindle motor according to claim 6, wherein a solid film of an oil repelling agent is applied at a top surface of said bearing sleeve along its opening edge, and wherein a solid film of an oil repelling agent is applied to an outer peripheral surface of said rotational shaft immediately above said opening of said bearing sleeve.

11. A recording disk drive device comprising:
a recording disk;
a data head writing and reading data from said recording disk; and
a spindle motor including a hydrodynamic bearing, said hydrodynamic bearing further comprising:
a bearing sleeve;
a rotational shaft supported for rotation by said bearing sleeve;
a bearing gap formed between said bearing sleeve and said rotational shaft;
lubricating oil contained within said bearing gap;
at least one hydrodynamic pressure-generating groove formed at an inner peripheral surface of said bearing sleeve;
an oil reservoir further comprising a gradually expanding section located in a position distanced from said at least one pressure-generating groove and a first larger inner diameter section located adjacently to said gradually expanding section;
a second larger inner diameter section located immediately below an opening of said bearing sleeve; and
an oil-repelling peripheral groove located between said first larger inner diameter section of said oil reservoir and said second larger inner diameter section,
wherein an opening of said oil-repelling peripheral groove gradually widens towards the inside of said bearing sleeve, wherein a first side surface of said oil-repelling peripheral groove forms an oil splash back wall surface, wherein said lubricating oil is filled to a position where a non-operational fluid level of said lubricating oil is located within said first larger inner diameter section, and wherein a configuration of said first side surface of said oil-repelling peripheral groove prevents overflow and scatter of said lubricating oil beyond said first side surface of said oil-repelling peripheral groove even when an external force is received by said hydrodynamic bearing.

12. The recording disk drive device according to claim 11, wherein a line tangent to at least a portion of said first side surface of said oil-repelling peripheral groove forms an acute angle with a central axis of said bearing sleeve when viewed from inside of said oil-repelling peripheral groove.

13. The recording disk drive device according to claim 11, wherein an inner diameter of said second larger inner diameter section is smaller than an inner diameter of said first larger inner diameter section.

14. The recording disk drive device according to claim 11, wherein said first larger inner diameter section further comprises a taper gradually increasing an inner diameter towards the opening of said bearing sleeve.

15. The recording disk drive device according to claim 11, wherein a solid film of an oil repelling agent is applied at a top surface of said bearing sleeve along its opening edge, and wherein a solid film of an oil repelling agent is applied to an outer peripheral surface of said rotational shaft immediately above said opening of said bearing sleeve.

16. The recording disk drive device according to claim 11, wherein said data head is a magnetic head.

17. The recording disk drive device according to claim 11, wherein said data head is an optical head.

* * * * *